United States Patent

Novice

[11] 3,952,118
[45] Apr. 20, 1976

[54] METHOD FOR HOT-END COATING OF GLASS CONTAINERS

[75] Inventor: Michael A. Novice, Elmira, N.Y.

[73] Assignee: Dart Industries Inc., Los Angeles, Calif.

[22] Filed: Oct. 17, 1974

[21] Appl. No.: 515,744

Related U.S. Application Data

[63] Continuation of Ser. No. 280,376, Aug. 14, 1972, abandoned.

[52] U.S. Cl. .............................. 427/255; 65/60 D; 118/48; 118/49; 427/226; 427/314
[51] Int. Cl.² .................... C03C 17/22; B05D 3/02
[58] Field of Search ............... 427/314, 226, 255; 65/60; 118/48–49.5, 314, 315

[56] References Cited
UNITED STATES PATENTS

| | | | |
|---|---|---|---|
| 2,813,045 | 11/1957 | Abbot | 118/48 |
| 3,353,514 | 11/1967 | Lyle | 118/49 |
| 3,438,803 | 4/1969 | Dubble | 427/255 |
| 3,479,208 | 11/1969 | Dubble | 427/424 |
| 3,516,811 | 6/1970 | Gatchet | 65/60 |
| 3,561,940 | 2/1971 | Scholes | 427/255 |
| 3,615,327 | 10/1971 | McLary | 65/60 |
| 3,623,854 | 11/1971 | Frank | 65/60 |
| 3,658,304 | 4/1972 | Hall | 118/48 |
| 3,684,469 | 8/1972 | Goelzer | 65/60 |
| 3,741,744 | 6/1973 | Bowman | 65/60 |

Primary Examiner—Ronald H. Smith
Assistant Examiner—William H. Schmidt
Attorney, Agent, or Firm—Kenneth J. Hovet; Paul R. Wylie; Leigh Taylor

[57] ABSTRACT

The present invention relates to a method and apparatus for treating vitreous surfaces such as glass with a coating material introduced upwardly into a coating area or chamber from below a conveyor means which transports the article through such coating area. Distributor means with spaced outlet perforations or openings communicating with the coating area is placed below such coating area and is provided with a source of coating material.

4 Claims, 8 Drawing Figures

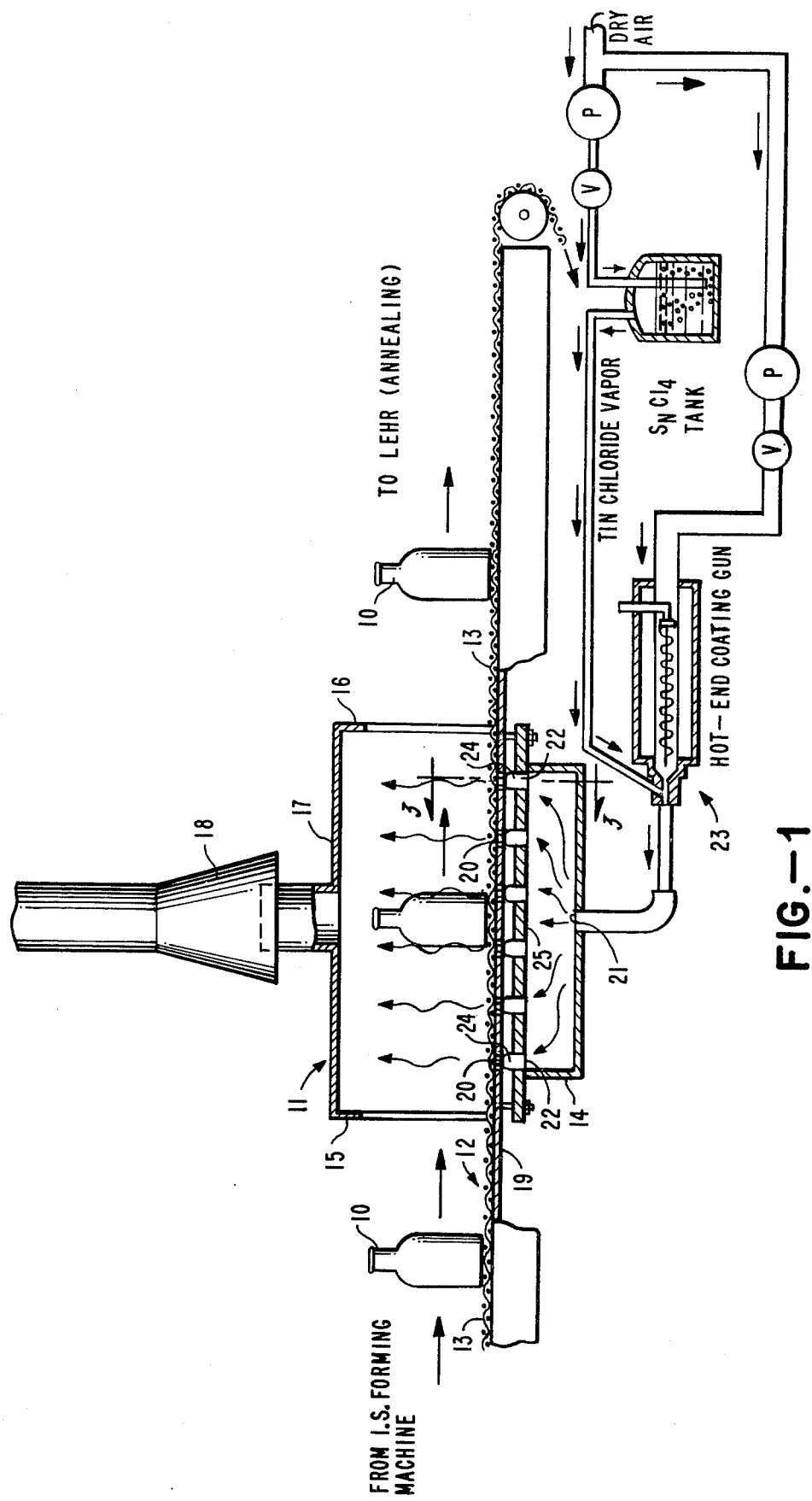

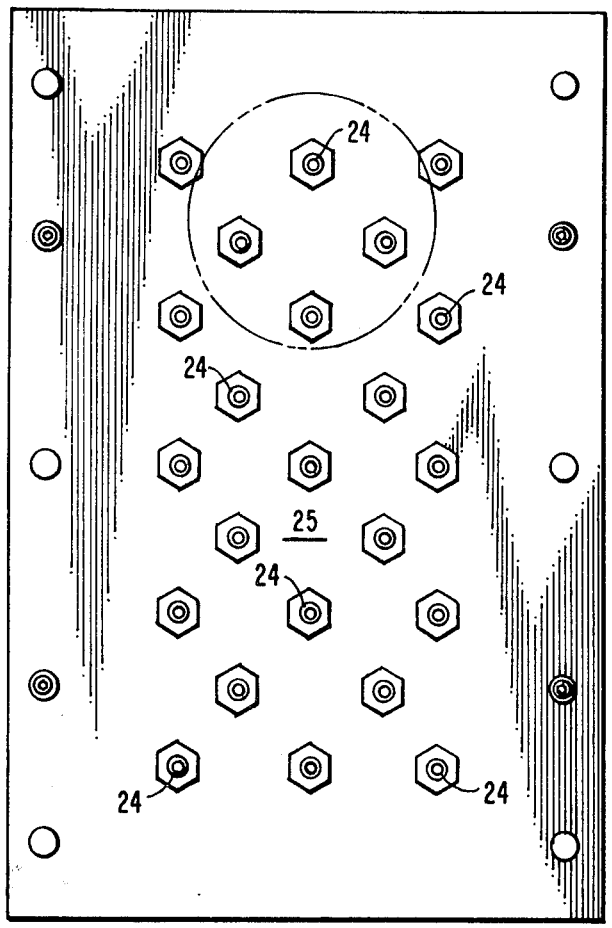
FIG.—2
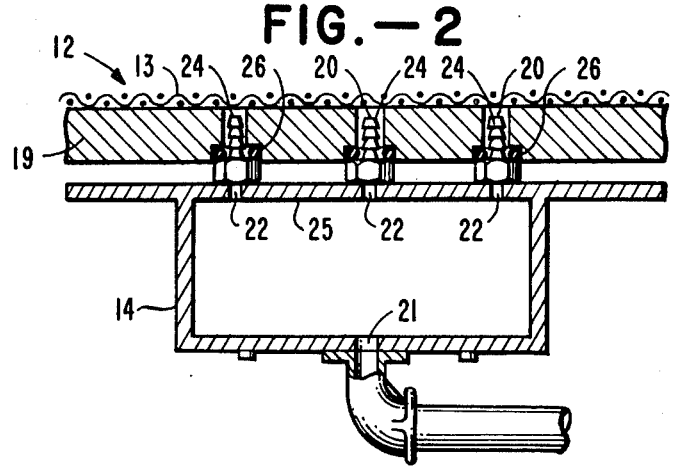
FIG.—3

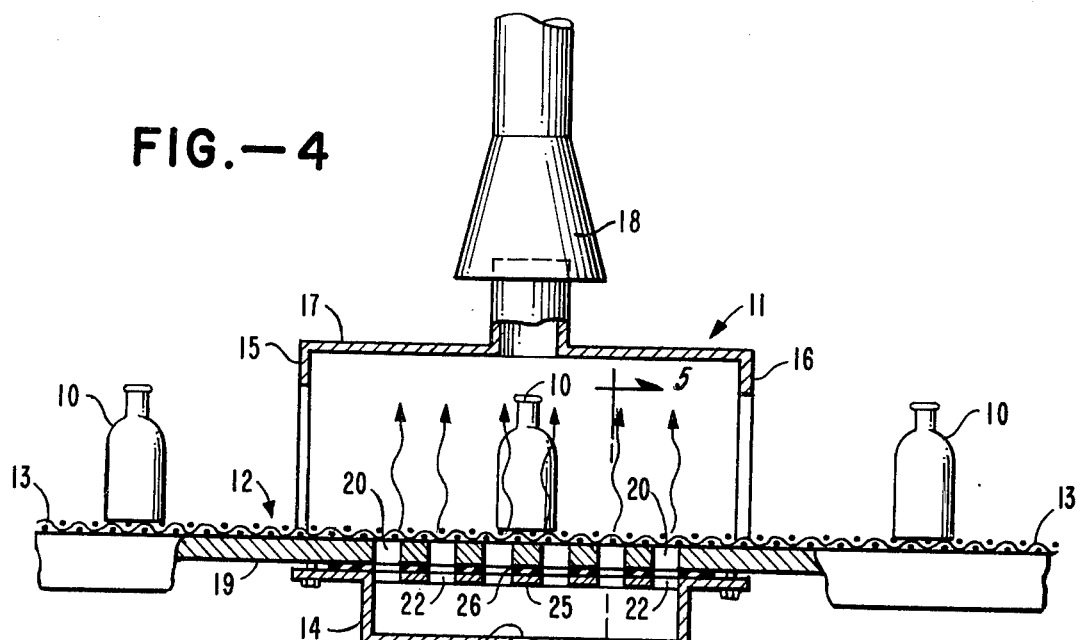
FIG.—4
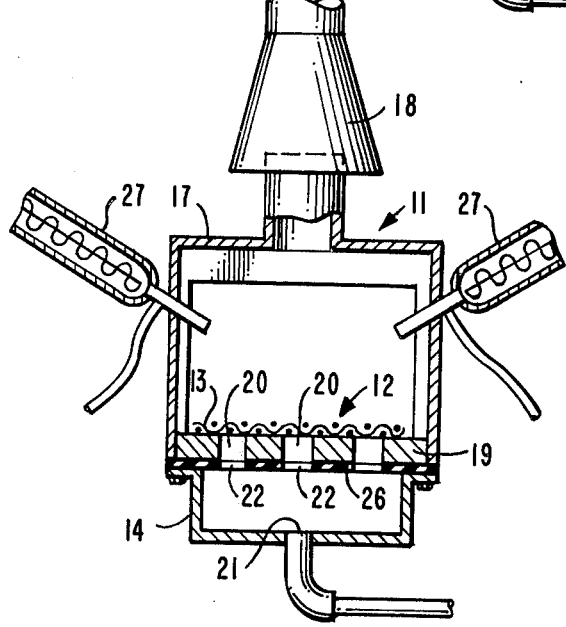
FIG.—6
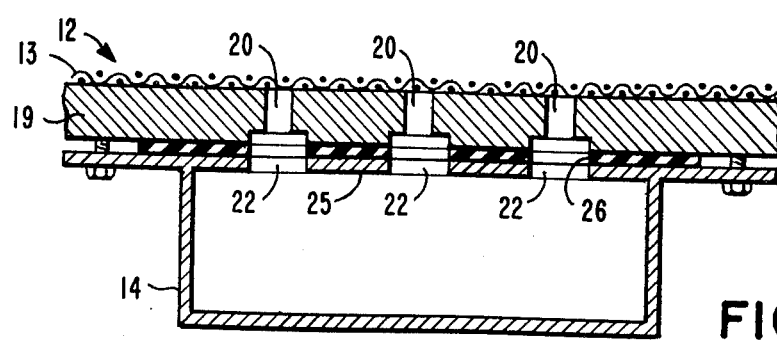
FIG.—5

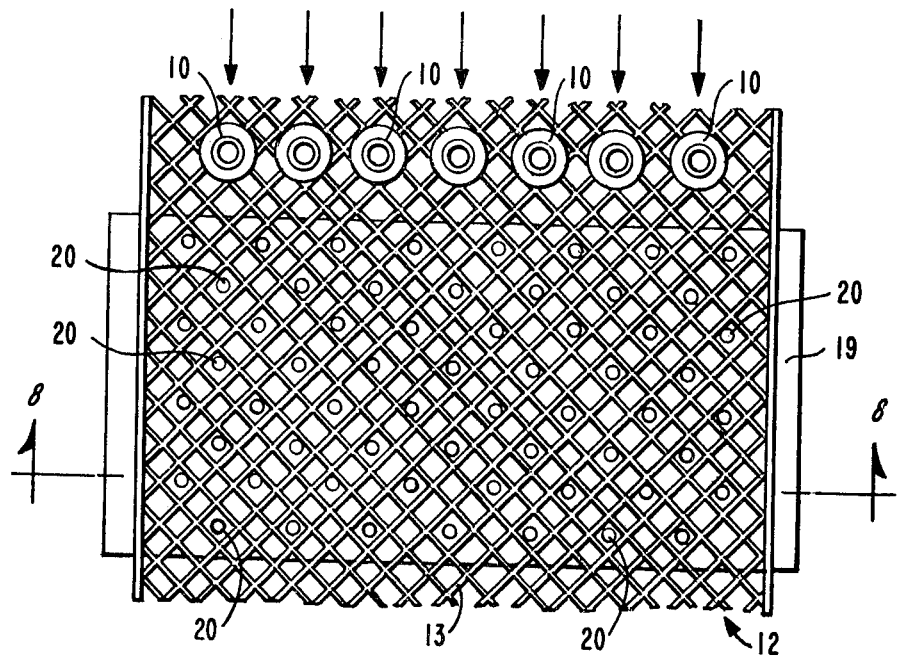
FIG.—7
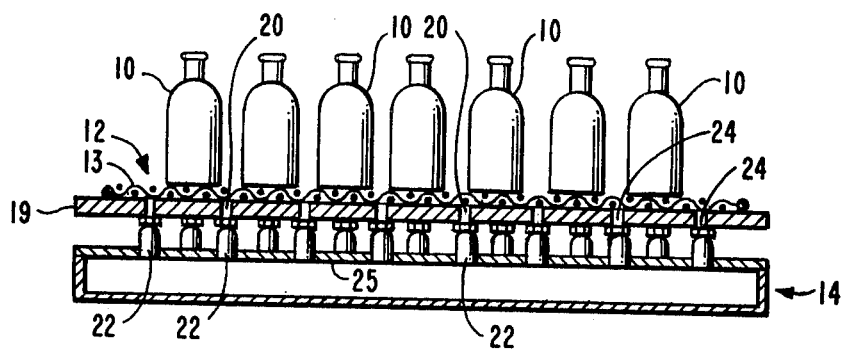
FIG.—8

METHOD FOR HOT-END COATING OF GLASS CONTAINERS

This is a continuation of application Ser. No. 280,376, filed Aug. 14, 1972, now abandoned.

BACKGROUND OF THE INVENTION

1. Field of Invention

This invention relates to a process and apparatus for treating vitreous surfaces such as glass. More specifically, it preferably relates to a process for treating the surface of newly formed glass bottles still retaining their heat of formation.

2. Description of the Prior Art

In the prior art, coatings have been applied to vitreous surfaces for various purposes. Such purposes include promoting adhesion between a vitreous surface and another substance, coloring the vitreous surface, controlling reflectance thereof, increasing electrical conductivity over the vitreous surface, increasing strength and durability of articles having such surfaces and increasing abrasion and scratch resistance of the surface.

It is well known in the art that glass derives its strength and durability in part from an unblemished surface. Scratches or flaws in the surface of a glass article substantially reduce its strength and decrease the contact force needed to break the article.

It is also well known that impact resistance of glass is greatest for newly formed articles because their surfaces have not been abraded by handling equipment or contact with other objects.

It is, therefore, an object of the present invention to provide an apparatus and process for coating newly formed glass bottles which will increase resistance to surface scratches and abrasion and thus increase the durability and strength of the bottle.

It is known in the art that bottles may be coated at various points in the processing line. They may be coated immediately after formation, at the hot end of the processing line, and/or at the cold end of the line prior to packaging. Coating at the cold end alone has proved unsatisfactory in that no protection is afforded during the earlier steps of processing where articles may contact machinery or each other and thereby become scratched or checked prior to application of a coating. The earlier in the processing line that a coating is applied, the greater will be the scratch resistance of the surface as it proceeds through that processing line. By coating the article after formation and while it still retains its heat of formation there is less likelihood that the article will be abraded during processing. Greater processing line efficiencies can thus be obtained by placing articles closer together during processing and increasing the speed of conveyors. It is, therefore, a further object of the present invention to carry out coating immediately after formation of the article and while the formed article still retains its heat of formation. It should, however, be understood that the substance of the invention is not limited to this particular mode of operation.

In the prior art, attempts have been made to coat a formed glass article by immersion in a liquid containing a metallic coating material. This method, however, subjects the article to unnecessary stresses and tends to deposit very uneven coatings.

There is also known in the prior art the method of applying the coating in a vapor stream by aiming the vapor stream at the article to be coated. This method has the disadvantages that the vapor is lost to the surrounding environment, polluting same, and that directional control over the vapor and control over vapor concentration is difficult to properly maintain.

Many of the complications of the vapor system were solved by carrying out vapor coating in a vented hood. In general, devices to practice this method relied on sources of vapor emanating from the sidewalls of the hood or from guns placed under the hood. Such methods, however, tend to produce satisfactory coating of sidewalls, but rather unpredictable results on the bottom of the articles being coated.

There is also disclosed in the prior art flame coating methods for applying coatings wherein the coating material is incorporated into a combustible vapor which is thereafter directed toward and burned about the article to be coated. The resulting product is generally unsatisfactory due to a residue which frequently appears on the surface of the coated article.

All of the above mentioned prior art methods have one common and serious disadvantage. Although they provide a satisfactory coating on the surface at which they are directed, the results on other surfaces is unpredictable. The present invention produces predictable and satisfactory results as to bottom and side surfaces.

The prior art has recognized the need for a method which will simultaneously coat both sides and the bottom of a glass container. Since no such method was available, alternate methods were employed to protect the bottom portion of glass articles whose sides were being coated. One such alternate method is shown in U.S. Pat. No. 3,561,940 wherein the conveyor belt is coated by a flame treatment process to prevent the metal of the conveyor from contacting the knurled portion of the bottom of the container.

The principal object and advantage of the present invention, therefore, is to provide a method and apparatus whereby the sides and the lower end of a glass bottle can be simultaneously coated in one operation.

SUMMARY OF THE INVENTION

A process and apparatus for coating articles having vitreous surfaces is defined by the present invention. More particularly, the invention relates to a process and apparatus for hot end coating glass bottles wherein the bottom and sides of same are simultaneously coated with a protective material in a single, continuous operation. Specifically the invention involves application of a coating material to the vitreous surface from beneath a perforate conveyor.

As discussed above, there are a number of reasons for coating glass surfaces. The present invention is directed to increasing the strength and durability of glass articles and articles having glass or other vitreous surfaces by coating such surfaces to increase scratch resistance.

The process of the invention includes transferring the article to be coated from a forming machine to a conveyor means which transports the article away from the forming machine and introduces it into a coating chamber. The transfer is made immediately after formation has been completed so that the article still retains most of its heat of formation. The temperature of the surface of the article in the coating chamber must be above the pyrolysis or decomposition temperature of a coating material to be applied to the article. The conveyor means includes a perforate belt member for transferring the article and a channel member over which the belt member moves, the channel member being specially adapted as hereinafter described to permit passage of coating material upwardly into the coating chamber.

As the article passes through the coating chamber, the coating material is introduced upwardly through inlet ports in the channel member, to the lower surface of the perforate belt member and through the perforate belt member and into the coating chamber to react with the vitreous surface of the article.

The inlet ports in the channel member are spaced such that the coating material is supplied to the bottom of the article through one or more centrally spaced ports and to the sides of the article through multiple peripherally spaced ports. The spacing and size of the inlet ports used will depend on the desired thickness of the coating to be applied to the bottom, the desired thickness to be applied to the sides of the article and the desired ratio of thicknesses of side coating to bottom coating.

The coating material introduced into the coating chamber flows upwardly around the walls of the article thus coming into reacting contact with all outer surfaces thereof and coating the same. The thickness of the coating which results depends upon the temperature of the glass at the point of contact with the coating material and also on the concentration of the coating material at the point of contact.

It is apparent, therefore, that the coating will be slightly thicker at the bottom of the article where the temperature is the greatest due to the extra thickness of glass in the area and where the concentration of the coating material is greatest. Toward the top of the article the coating thickness will be slightly decreased due to a lower glass temperature and a decreased coating material concentration in the upper portion of the chamber. Providing a constant flow of coating material upwardly through the chamber tends to maximize concentration of coating material throughout the chamber and to minimize the decrease in coating thickness toward the top of the article. The uniformity of coating can also be maximized by decreasing the number or size of inlet ports directly under the article and/or increasing the size and/or number of inlet ports introducing coating material peripherally of the sidewalls of the article being coated.

Nevertheless, where the article being coated is extremely tall, as with large (1 quart or more) beverage containers, it may be necessary to provide additional coating material to increase the uniformity of thickness of the coating. Where this becomes necessary, auxiliary coating guns may be supplied to introduce coating material through the sides of the coating chamber. The coating material so introduced may be heated or not depending on the particular requirements of the article being coated.

The article is removed from the coating chamber after reaction with the coating material. The reaction products are continuously exhausted from the chamber before, during and after the coating of an article.

The apparatus for carrying out the above method comprises a coating chamber which is at least partially enclosed, this chamber being provided with openings through which conveyor means passes and through which articles to be coated are introduced and removed. A perforate belt member of such conveyor means defines at least part of a lower wall of said chamber and is adapted to permit the upward passage of coating material. A channel member of said conveyor means provides support for said belt member. The channel member is provided with spaced inlet ports beneath said chamber through which coating material is introduced upwardly into said chamber. The upper wall of the chamber is provided with a venting port to remove reaction products.

Beneath the conveyor means is located distributor means communicating with inlet ports of the channel member for providing coating material to the coating chamber. The distributor means also communicates with a source of coating material and is adapted to communicate with all inlet ports or withh selected inlet ports and to close or permit closing of those inlet ports which are not in use. This is accomplished by using interchangeable gaskets or movable nozzles and plugs as will hereafter be described. The distributor means is also adapted to be sealingly affixed to the bottom of the channel member to prevent ambient air from being introduced into the chamber from below.

A modification of the preferred embodiment provides a device to simultaneously coat a plurality of bottles residing in a side by side relationship transverse to the direction of movement of the conveying means.

BRIEF DESCRIPTION OF THE DRAWING

FIG. 1: Is a side elevation embodying the apparatus of the present invention partially broken away and partially in cross section to show the various details thereof.

FIG. 2: Is a top plan view of the distributor means showing the relationship of nozzles therein to a superimposed glass bottle shown in phantom lines.

FIG. 3: Is a cross-sectional end view taken along line 3—3 of FIG. 1.

FIG. 4: Is a side elevation partially broken away and in cross section to show a preferred embodiment of the invention.

FIG. 5: Is an exploded cross-sectional end view of the preferred embodiment shown in FIG. 4 taken at plane 5—5 of FIG. 4.

FIG. 6: is an end elevation showing the under belt coater being utilized in combination with auxiliary side coating guns.

FIG. 7: Is a top plan view of another embodiment of the invention which arrangement is a plurality of bottles residing in a side by side relationship transverse to the direction of movement of the conveying means.

FIG. 8: Is an end elevation of the embodiment shown in FIG. 7 taken at plane 8—8 of FIG. 7.

DESCRIPTION OF THE PREFERRED EMBODIMENTS

The invention relates to a method for coating articles having surfaces of vitreous materials and for a novel device for carrying out such method.

According to the method of the present invention, an article 10 of vitreous material or having a surface of vitreous material and typically a bottle produced according to conventional practice, in its early stages of transfer from the forming machine (not shown) must be protectively coated. Upon removal from the forming machine, the temperature of the article is below its melting temperature but well above a decomposition temperature for the coating materials that are usually applied at such location (i.e. hot end). Generally, this temperature is in the range of 1,200 to 1,600 degrees farenheit.

Refering to FIG. 1 in particular, it can be seen that the article 10 is transferred by conveyor 12 and introduced into a coating chamber or coating area 11, ideally immediately after completion of formation and while it still retains most of its heat of formation. The transfer should be made quickly and in such a manner as to prevent undue losses of heat during the transfer, but it is permissible for example to allow the temperature of the article to decrease by one to two hundred degrees before coating commences. In a preferred embodiment, as indicated above, the transfer is effected by conveyor means 12 which employs a perforate movable belt member 13, the belt member 13 carrying the article from the forming machine and through the coating chamber 11 to an annealing lehr (not shown) for further processing.

While the article to be coated is in the coating chamber 11, a coating material is introduced into the chamber from below the conveyor belt 13. The coating materials normally used are halides of metals preferably selected from the group consisting of iron, tin, titanium, vanadium and zirconium. Other metals, however, may be used and are within the scope and spirit of the present invention.

The coating material used in the preferred embodiment is stannic chloride supplied to the coating chamber in vapor form in an appropriate concentration in an inert gaseous carrier. The stannic chloride vapor is formed by passing an inert carrier through a stannic chloride solution and mixing the resulting stannic chloride vapor in a stream of the inert gaseous carrier to produce the required concentration of coating material. The inert gaseous carrier utilized in the preferred embodiment is air, but may be selected from the group consisting of air, argon or helium or any other gas, such as nitrogen, which does not react chemically with the stannic chloride. The coating material is passed through a distributor means 14 upwardly into the coating chamber 11 as hereinafter described.

The coating material enters the coating chamber from below through spaced ports and rises to the top of the coating chamber. The temperature of the material introduced into the chamber may be above ambient temperature. The movement of the belt member 13 through which the coating material passes into the coating chamber causes the coating material to form eddies or clouds which brings the coating material into contact with the side surfaces of the article to be coated. Likewise, the bottom of the article is exposed to coating material introduced through one or more ports below the bottom of the article.

The coating material reacts with the vitreous material of the article while the article is in or passing through the coating chamber. It is believed that the coating occurs by reacting hydroxy and alkoxy groups on the hot glass surface with the selected metallic halide to form a metallic oxide coating, producing a reaction product which are pollutants which if released into the atmosphere surrounding the coating area could be harmful to health. The reaction products are therefore exhausted by suitable venting or exhaust means 18 from the coating chamber in sufficient quantity to generate an upward flow and to prevent escape to the surrounding area.

The coated article still being moved with and by conveyor means is then removed from the coating chamber and carried down the line for further processing.

The method of the present invention may also be combined with known methods of coating bottles. For example, if extremely tall glass articles are to be coated and greater uniformity in coating thickness is required, it may be necessary to provide auxiliary side coating guns to introduce additional coating material to the chamber. The auxiliary guns may be adapted to introduce additional coating material through the wall of the coating chamber as shown in FIG. 6 or they may be situated within the chamber or at the ends thereof.

The method may be applied to coat bottles entering the coating chamber in single file as shown in FIGS. 2, 3, 5 and 6 or for simultaneously coating of multiple articles aligned substantially transversely to the direction of movement of the belt member 13.

The apparatus for carrying out the method may best be understood by reference to the accompanying drawing.

Referring again in particular to FIG. 1, a coating chamber 11 is placed above a conveyor means 12. The chamber 11 is at least partially enclosed to permit concentrations of coating material to be contained therein without undue disturbance from the surrounding environment. The coating chamber is provided with openings at opposite ends 15 and 16 to permit passage of articles to be coated. The top 17 of the coating chamber 11 is provided with exhaust means 18 to exhaust reaction products from the coating chamber.

The lower wall of the coating chamber comprises, at least in part, the belt member 13 of conveyor means 12 which is movable over a channel member 19 in the direction shown by the arrows in FIG. 1. Belt member 12 is sufficiently perforate to permit upward passage of coating material into chamber 11. In the preferred embodiment the perforate belt member 13 is a metallic mesh.

As indicated conveyor means 12 includes channel member 19 which provides support for belt member 13 and over which said belt member moves. Beneath the coating chamber 11 inlet ports 20 are provided in channel member 19 which inlet ports communicate between perforate belt member 13 on the upper side and with distributor means 14 on a lower side thereof. Coating material is introduced upwardly into the coating chamber 11 through the spaced inlet ports 20 and through the perforate belt member 13.

In the embodiment shown in FIGS. 1 and 8 of the present invention outlet nozzles 24 are provided in outlet openings 22 to communicate between distributor 14 and inlet ports 20. The nozzles 24 sealingly contact inlet ports 20, suitable sealing rings being provided to assure that no ambient air enters the system. The spacing and number of inlet ports used may be varied by removing nozzles and by sealing the inlet and outlet ports associated therewith or by simply closing off selected inlet ports.

In a preferred arrangement as is shown in FIGS. 4 and 5, the distributor means 14 is provided with a source 23 of coating material which may be supplied to the distributor means through the bottom through opening 21 or through the side thereof, the latter arrangement not shown in the drawings. The upper wall 25 of distributor means 14 is perforate, being provided with spaced openings or perforations 22 adapted to communicate directly with inlet ports 20. Distributor means 14 being sealingly affixed to channel member 19 with gasket member 26 inserted between such means 14 and channel member 19 to prevent ambient air from entering the system. Selected inlet and outlet ports may again be, of course, closed off if desired by utilizing a gasket member which is provided with no opening for the ports which one desires to incapacitate.

If tall articles are being coated and uniformity of coating is critical to a particular application, auxiliary side coating guns 27 may be provided, as shown in FIG. 6, to supply additional coating material to the chamber. Such auxiliary side coating guns 27 may be utilized with either of the arrangements discussed in preceding paragraphs.

As shown in FIG. 2 the relationship of the inlet and outlet ports to a bottle traveling through the coating chamber 11 is such that at least one stream of coating material is introduced from directly beneath the article to provide coating material to the bottom of the article, while other streams of coating material are introduced slightly peripherally of the outer sidewall of the bottle, thereby providing coating material to the sidewalls.

In another embodiment of the invention as may be seen in FIGS. 7 and 8, the distributor means 14 may be modified to include a plurality of sparger-like members extending across the width of perforated belt member 13. Such a modification enables the simultaneous coating of several articles 10 as may be aligned or substantially aligned in a direction transverse to the direction of movement of the noted belt. This modification, of course, includes the basic elements as are above described in connection with the preferred embodiment. Further, minor modifications thereof may also be appropriate to accomodate the wider belt arrangement but otherwise the structural configuration and its associated function remains unchanged.

I claim:

1. A method of continuously coating a plurality of elongate upstanding vitreous articles carried by conveyor means with a coating material comprising a metallic halide of a metal selected from the group consisting of iron, tin, titanium, vanadium and zirconium comprising:

A. introducing said articles into a coating area beneath which is positioned a plurality of discretely located inlet ports, said articles being above the pyrolysis temperature of said coating material but below the melting temperature of said vitreous material;

B. orienting and retaining said conveyor means and articles carried thereby in a predetermined path of movement so that said inlet ports are positioned underneath said articles and along the lateral extremities of said path of movement in approximate alignment with the article sidewalls;

C. introducing said coating material to a plurality of outlet nozzles each of which is in communication with a single respective inlet port and passing said material upwardly through said outlet nozzle and inlet ports thereby directing the flow of said material around said articles;

D. maintaining said coating material within said area and in contact with the articles passing therethrough; and, E. venting reaction products and/or residue of said coating material from said coating area in a controlled manner so as to prevent contamination adjacent said area.

2. The method of claim 1 wherein said coating material is introduced with an inert gaseous carrier.

3. The method of claim 2 wherein said inert gaseous carrier is selected from the group consisting of air, argon and helium.

4. The method of claim 3 wherein the temperature at which said coating material is introduced into said chamber is above ambient temperature.

* * * * *